No. 818,747. PATENTED APR. 24, 1906.
E. P. COWLES.
VARIABLE SPEED FRICTION GEARING.
APPLICATION FILED OCT. 4, 1902.
6 SHEETS—SHEET 3.
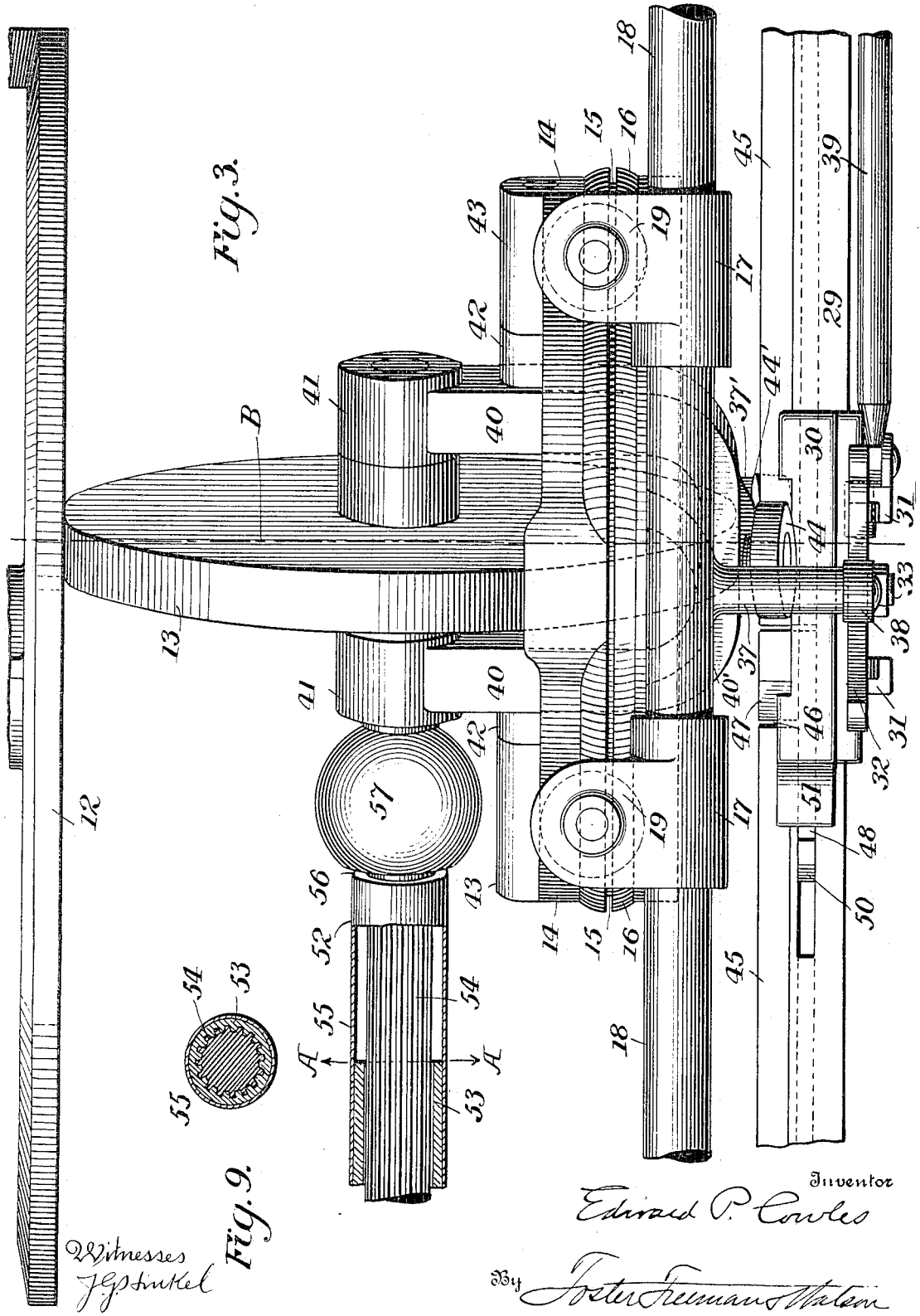

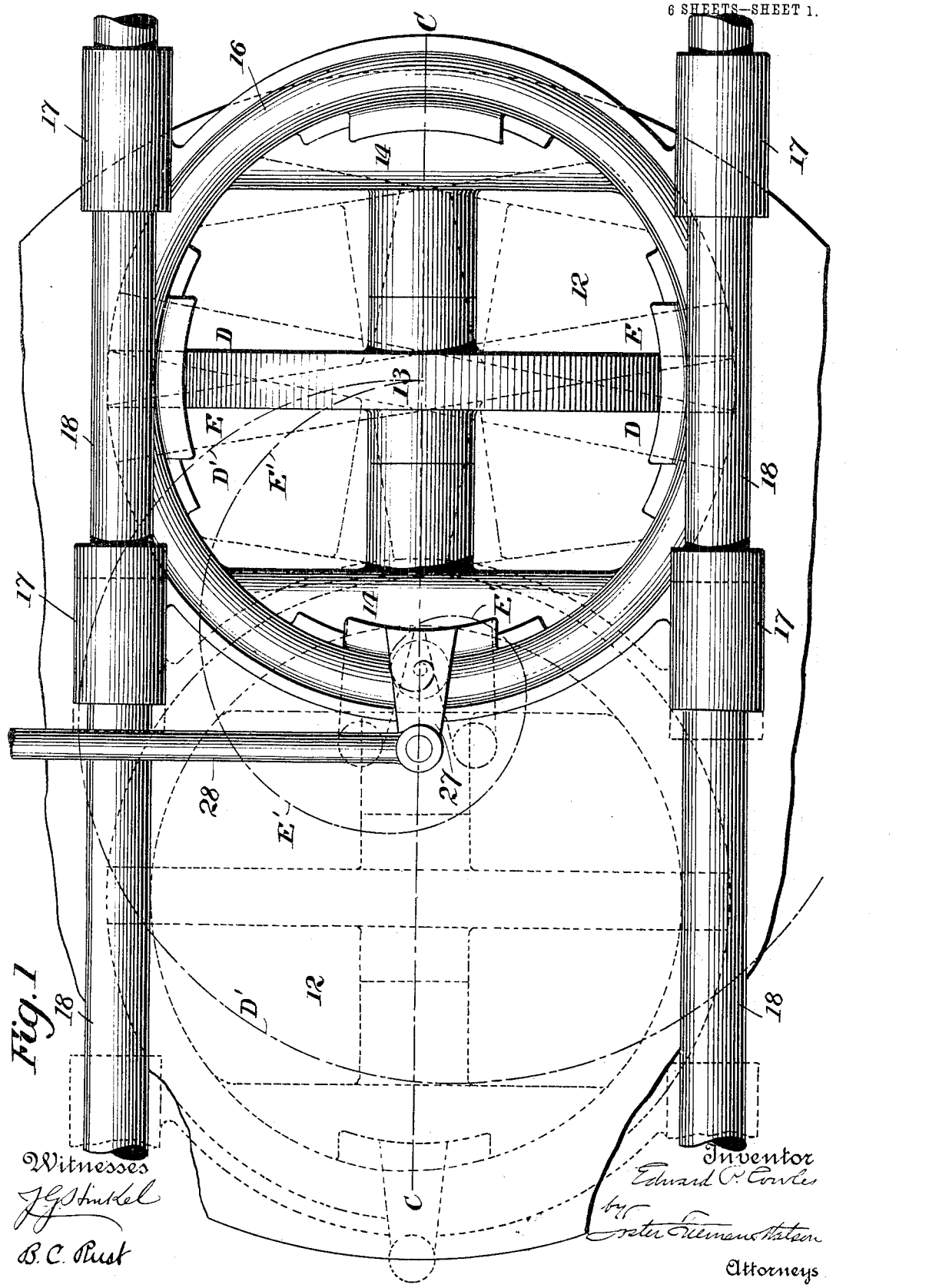

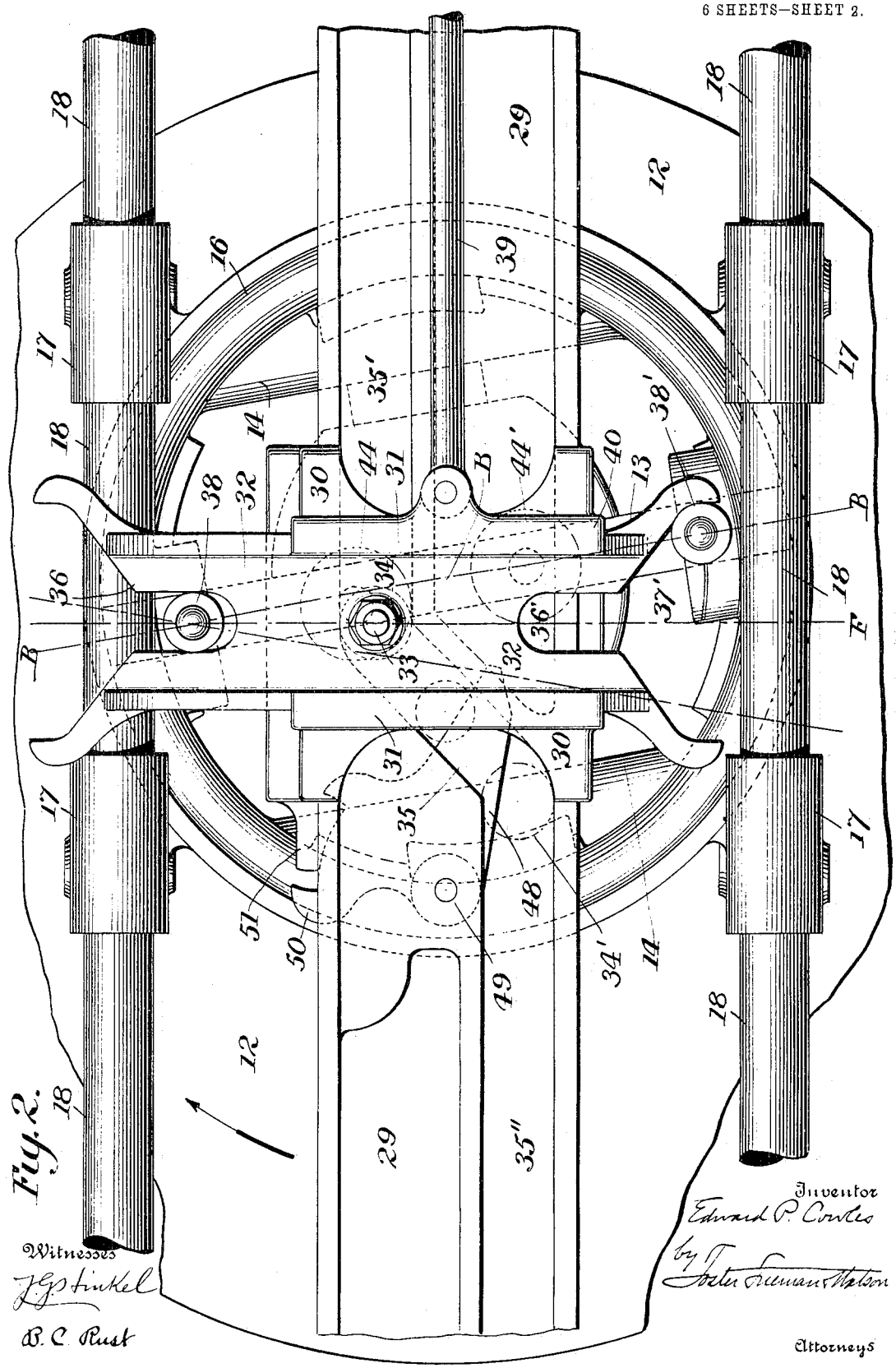

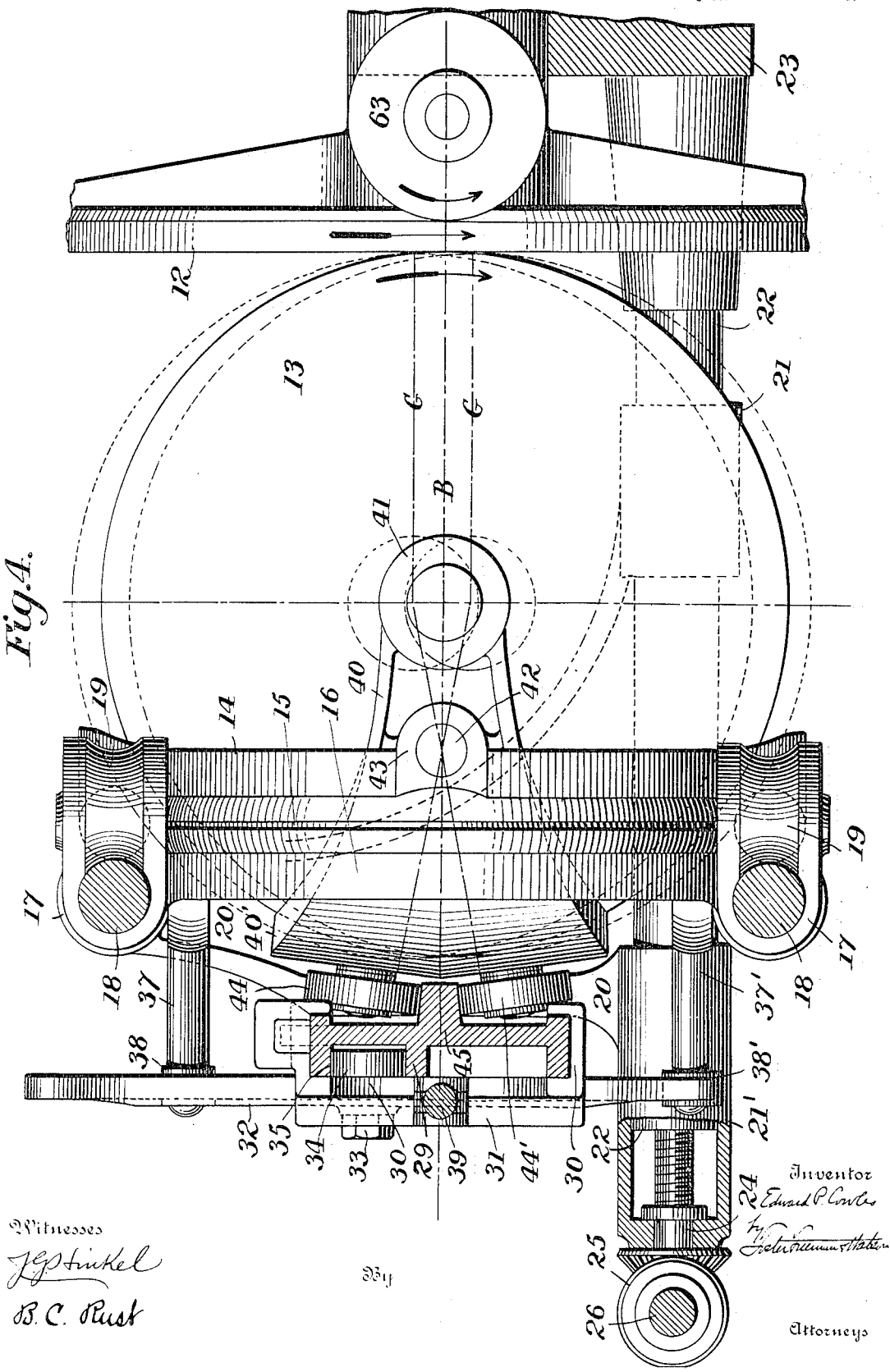

No. 818,747. PATENTED APR. 24, 1906.
E. P. COWLES.
VARIABLE SPEED FRICTION GEARING.
APPLICATION FILED OCT. 4, 1902.
6 SHEETS—SHEET 5.
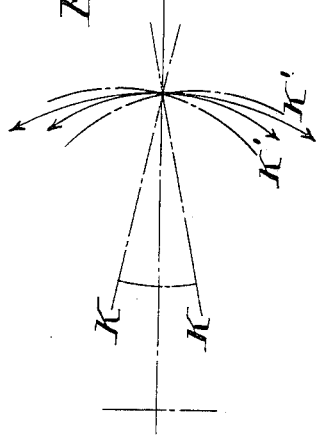
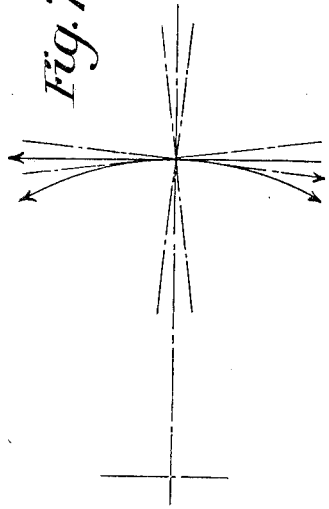
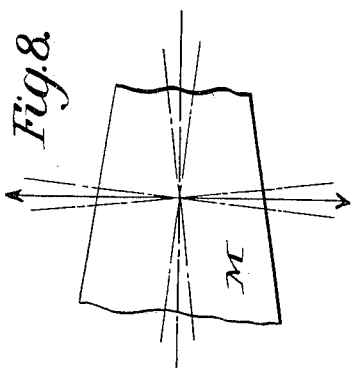
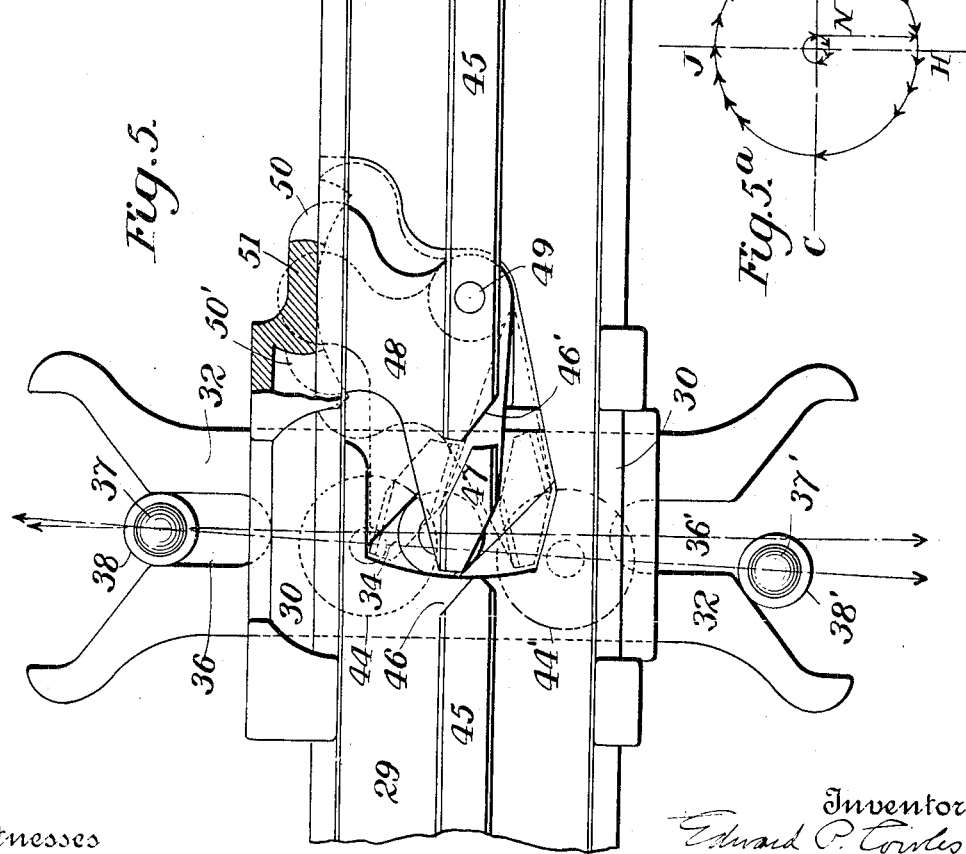
Witnesses
Inventor
Edward P. Cowles
Attorneys

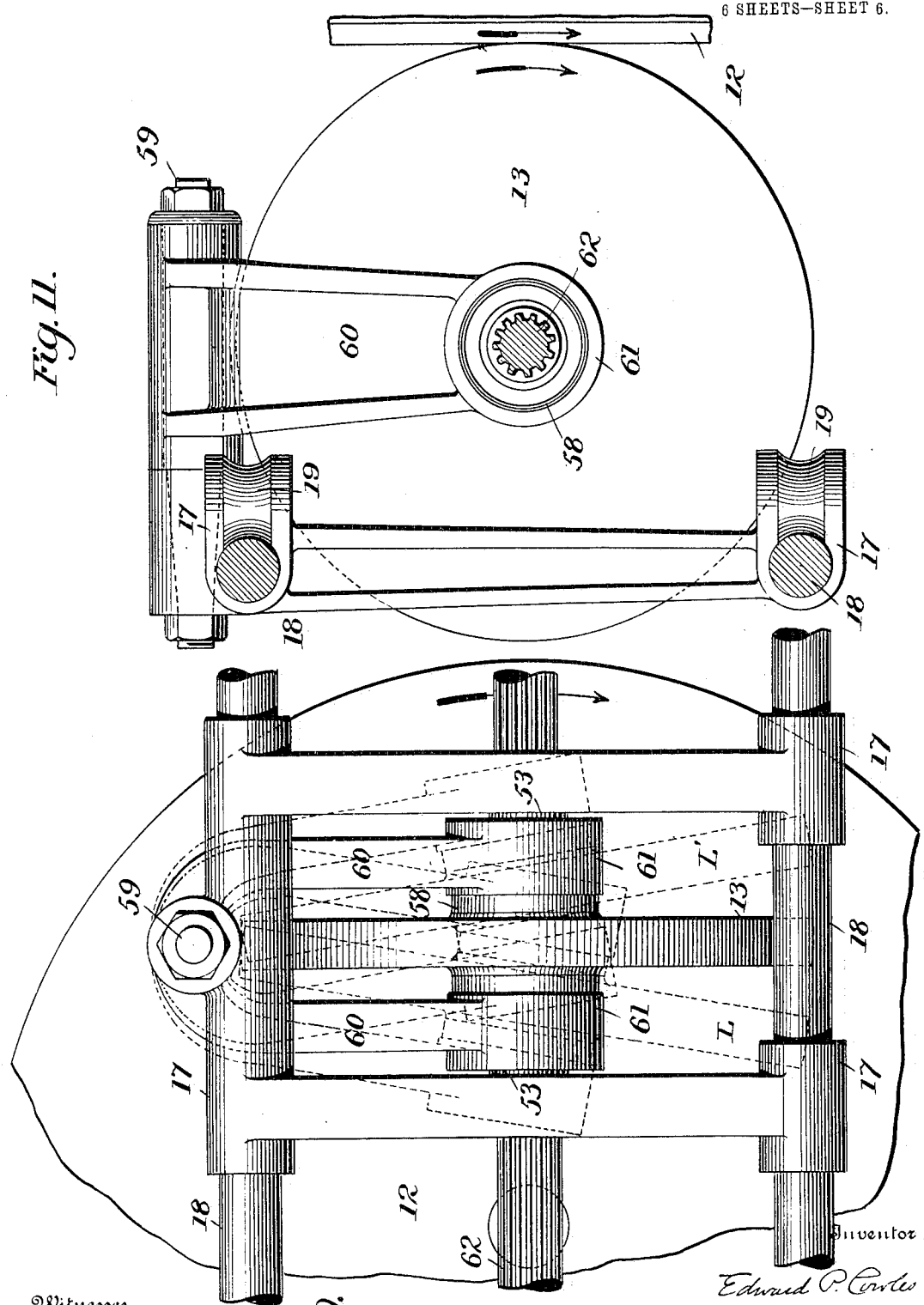

UNITED STATES PATENT OFFICE.

EDWARD P. COWLES, OF WARREN, OHIO.

VARIABLE-SPEED FRICTION-GEARING.

No. 818,747.  Specification of Letters Patent.  Patented April 24, 1906.

Application filed October 4, 1902. Serial No. 125,930.

*To all whom it may concern:*

Be it known that I, EDWARD P. COWLES, a citizen of the United States, residing at Warren, in the county of Trumbull and State of Ohio, have invented certain new and useful Improvements in Variable-Speed Friction-Gearing, of which the following is a specification.

My invention relates to variable-speed friction-transmission gears, and is especially adapted to motor-vehicles operated by non-reversing motors.

It has for its object the adaptation of my automatically-traversing friction-wheel, Patent No. 654,716, dated July 31, 1900, to friction transmissions, consisting of a disk having a friction-wheel traversing across its face on one side of the center for forward motion and on the opposite side of said center for reverse motion.

It consists, first, in means for causing the friction-wheel to automatically follow the impulse to cause it to traverse from center to circumference of disk, or the reverse, on either side of the center, and remain stationary with respect to center of disk when this impulse is withdrawn; second, means for shifting the oscillating pivot to cause the friction-wheel to traverse the same way on the opposite or backing side of disk; third, means for causing the friction-wheel to traverse automatically across the "dead-center" of the disk.

The invention consists, further, in various improvements in construction and arrangement of parts, and in specific devices for effecting the various movements, all of which will be fully described in the following specification, reference being had to the accompanying drawings, in which—

Figure 1 is a simplified back view to show plainer the automatically-traversing principle. Fig. 2 is a back view complete. Fig. 3 is a top view. Fig. 4 is a side view with the right supporting-bracket removed. Fig. 5 is a front view of a portion of the guide-plate, showing tripping-cam. Fig. 5ᵃ is a diagram showing the principle of automatically traversing across the dead-center. Figs. 6, 7, and 8 are diagrams showing how my automatically-traversing friction can be adapted to every form of friction drive. Fig. 9 is a section on line A A, Fig. 3. Fig. 10 is a view showing how my automatically-traversing friction-wheel can be applied in the form of a "caster-wheel." Fig. 11 is a side view of Fig. 10.

Referring to the drawings, 12 indicates a driven friction-disk, preferably the balance-wheel of the motor. Engaging frictionally with the face of disk 12 is a friction-wheel 13, having bearings in a ring-like support 14. This support has its outer face parallel with face of disk 12 and is so arranged that a prolongation B of its axis passes through the center of the revolving plane of wheel 13 and the point of contact of said wheel with disk 12. This support 14 bears against a similar ring-like support or block 16, a suitable ball-bearing 15 being interposed between the adjacent faces, so that said support 14 may revolve to a limited extent on block 16 like a "fifth-wheel." This adapts friction-wheel 13 to be oscillated in its plane of revolution on axis B perpendicular to face of disk 12 at the point of contact. Block 16 is provided with sleeves 17, which slide on guide-bars 18 and serve to support it. These bars are placed parallel with face of disk 12 equally distant from it one above the other and the same distance from the plane of the center of said disk, so that the pressure employed to maintain wheel 13 in frictional contact with disk 12 is equally distributed between said sleeves 17. To reduce friction between the sleeves 17 and guide-bars 18, antifriction-rollers 19 are mounted on said sleeves to bear against bars 18 on the side from which such pressure comes. Bars 18 are of sufficient length to permit friction-wheel 13 to traverse the entire face of disk 12 on the diameter-line C C, Fig. 1. Said bars are supported at their ends by brackets 20, one of which is shown in Fig. 4, and these brackets are provded with sleeves 21 21', arranged to slice on bars 22, projecting from the motor-frame 23 on either side of disk 12 and having their axis perpendicular to the face of said disk.

The outer sleeves 21' extend over the ends of bars 22 and are each provided with a screw 24, which engages with a nut at the end of bar 22 and serve to adjust bracket 20 and bars 18 and friction-wheel 13 in contact with disk 12. The outer ends of screws 24 are connected by miter-gears 24 to a shaft 26, so that said bracket 20 and the guide-bars 18 may be moved toward disk 12 parallel with its face to take up wear. Shaft 26 is suitably connected to a hand-wheel conveniently accessible by the operator, so that the pressure of friction-wheel 13 against face of disk 12 can be adjusted at any time and regulated as desired.

In Fig. 1 the support 14 is shown as provided with an arm 27, to which is pivoted a rod 28, leading by suitable connections to a lever convenient to the operator. If arm 27 is raised to oscillate wheel 13 into the position shown by broken lines D, it will obviously traverse toward the periphery of disk 12, following the broken spiral line D', gradually increasing in speed as it approaches said periphery. If the arm 27 is depressed to bring wheel 13 into the position shown by broken lines E, it will traverse toward the center of the disk, following the broken spiral line E', gradually decreasing in speed. In the above description it has been assumed that the wheel 13 was at all times at the right of the center of disk 12, as represented in Fig. 1, and originally in the position shown in full lines in said figure. If, however, the supports of said wheel were adjusted to bring them into the positions indicated in dotted lines in Fig. 1 at the left of the center of disk 12, the effect of raising and lowering arm 27 would be exactly the reverse of that above described—that is, for a continuous movement to the left after passing the center, arm 27 would have to be raised to continue the movement by reason of friction-wheel 13 revolving in an opposite direction on the left side, and correspondingly in traversing disk 12 from left to right.

It is obvious that when friction-wheel 13 reaches the point desired unless arm 27 were moved back to bring the revolving plane of friction-wheel 13 mathematically exact to a perpendicular with the radius of disk 12 passing through the point of contact, it would "creep" slowly one way or the other. As it would be difficult or impossible to do this, I overcome these objections by employing the means shown in Figs. 2, 3, and 4 for adjusting the wheel 13 relative to the disk 12. In said figures the friction-wheel 13 is shown in position to traverse the disk 12 toward the center thereof. Referring to said figures, 29 indicates a guide-plate secured at its ends to brackets 20 and placed a short distance away from friction-wheel 13, being equally distant from and parallel with the guide-rods 18. Gibbed to the upper and lower edge of this guide-plate and sliding freely thereon from end to end is a block 30. This block is provided with vertical guides 31, in which slides up and down a plate 32. In the center of this plate is secured a stud 33, on which turns an antifriction-roller 34, which travels in a slot or recess 35 in guide-plate 29. This slot 35 is of the form shown in Fig. 2, having an intermediate section that extends diagonally of the guide-plate 29 across the center thereof and two oppositely-extending end sections situated, respectively, above and below the horizontal plane of the center of said guide-plate—that is, referring to Fig. 2, the right-hand end section 35' of said slot is situated above the horizontal plane of the center of the guide-plate 29 and the left-hand end section of the slot is situated below said center plane, both of said end sections of the slot extending parallel to the said central plane. It is obvious that as block 30 is moved along guide-plate 29 at the right of the center thereof, roller 34 will travel in the slot-section 35' and the plate 32 in the elevated position shown in Figs. 2 and 3. As block 30 passes the center of plate 29, the roller 34, following the diagonal part of slot 35, will force said the block down to the lower position shown by broken ine 34' in Fig. 2. As said roller traverses the slot-section 35" the block will be sustained in this lower position. In moving from left to right the above-described movement will be reversed.

The vertical plate 32 is slotted or forked at each end, as at 36 36', the outer ends of the forks being bent out like the letter V, as shown in Figs. 2 and 5. Projecting from the ring-support 14 are two studs 37 37' diametrically opposite and equally distant from axis B and situated in the revolving plane of friction-wheel 13. Said studs are provided on their outer ends with antifriction-rollers 38 38', which extend into the slots 36 36' in the vertical plate 32. The length of plate 32 is such that when one of said rollers is engaged by the straight part of one slot the other roller is disengaged and free to swing in the flaring part of the other slot, as shown in Fig. 2. A rod 39, pivoted to block 30, leads by suitable connections to a lever conveniently located for the operator to handle, by means of which the block 30 can be moved along the guide-plate 29.

In operation, assuming that friction-wheel 13 is contacting with the disk 12 at the right of the center of said disk and that the vertical plate 32 is elevated, the upper fork 36 will be engaged with upper friction-roller 38 and stud 37. If the operator, by means connected with rod 39, moves block 30, it will have the effect of oscillating ring 14 and friction-wheel 13 about the axis B, stud 37 having the function of arm 27, as explained in connection with Fig. 1, the lower stud and friction-roller 37' and 38' being free to swing in the flaring part of lower fork 36', as shown in Fig. 2. If block 30 is moved to the left, it will revolve ring 14 and friction-wheel 13 into the position shown by heavy lines in Fig. 2 or broken lines E, Fig. 1, and wheel 13 will traverse toward the center of disk 12. If block 30 is moved to the right, the wheel 13 will be turned into the position shown by broken lines D, Fig. 1, and will traverse toward the periphery of disk 12, as previously described, or, in other words, the friction-wheel 13 will always follow the movement of block 30 in either direction. It is obvious, from the direction of the motions of friction-wheel 13 and disk 12, that when block 30 ceases to move in either direction friction-wheel 13 will continue to traverse until its revolving plane is perpendicular to a radius of disk 12, passing through the point of contact, swinging on stud 37 like a pendulum, as shown by broken lines F, Fig. 2, and will remain in this position until block 30 is moved again.

If the friction-wheel is in contact with the disk 12 at the left of the center of said disk, its direction of motion is reversed. It will be obvious, after considering the direction of the motions of friction-wheel 13 and disk 12 on this side, that if the vertical plate continues to engage the upper stud and roller 37 38, it would have the effect to turn friction-wheel 13 into a position that would cause it to traverse the disk 12 in direction opposite that of the movement of block 30, and when the movement of block 30 ceased it would have a tendency to turn around on stud 37, instead of swinging into a position perpendicular to a radius of disk 12, passing through the point of contact of the friction-wheel with said disk. Therefore the stud 37 cannot be employed to oscillate the friction-wheel when said wheel is in contact with the disk 12 at the left of the center of said disk.

As hereinbefore explained, when block 30 passes the center of disk 12, the diagonal part of slot 35, acting on roller 34, attached to center of vertical plate 32, forces this plate down, which causes the lower slot 36' to engage roller 38' on lower stud 37', releasing the upper roller and stud 38 37 and leaving them free to swing in the flaring part of upper fork 36. In other words, it shifts the oscillating pivot to the opposite side of friction-wheel 13, as shown by broken line 34' in Fig. 2. It will be seen that in this position friction-wheel 13 will traverse the disk 12 when on the left side of the center of said disk in the same manner as when it is on the right of said center—that is, following the movement of block 30 either way and assuming a perpendicular position when block 30 ceases to move.

As friction-wheel 13 approaches the center of disk 12 from either direction it reaches a point where the motion is so slight that it will cease to traverse, and it would require the application of great power to rod 39 to force it across this dead-center. To overcome this difficulty, I adopt means whereby the friction-wheel 13 can be moved vertically about one-half inch above or below its traversing line C C. In the present instance this is accomplished by interposing a fork 40 between the friction-wheel 13 and supporting-ring 14. Friction-wheel 13 has bearings 41 in the ends of the arms of this fork, and the arms have journals 42 about midway between these bearings and the head of the fork, which journals turn in bearings 43 in the supporting-ring 14, permitting a limited oscillation of fork 40 on an axis parallel with the axis of friction-wheel 13, which has the effect of shifting the point of contact between friction-wheel 13 and disk 12 about one-half inch above or below the traversing line, as shown by broken lines G G, Fig. 4. The head 40' of this fork is provided with two antifriction-rollers 44 44', which travel, respectively, on the upper and lower sides of a rib 45, projecting from the front side of guide-plate 29, running parallel with and in the same horizontal plane with line of traverse C C. (Its office is to confine friction-wheel 13 to the line of traverse C C.) A portion of rib 45 near the center is cut away, leaving a gap 46 opposite the center of disk 12 of sufficient width to permit either one of the rollers 44 44' to drop into and allow fork 40 to cant and move friction-wheel 13 above or below the center line C C.

In operation, when the friction-wheel 13 is contacting with the disk 12 at the right of the center of said disk the force transmitted by said disk to the friction-wheel, as shown by arrows in Figs. 2 and 4, is down. This causes roller 44' to press up on the under side of rib 45, as is obvious. When friction-wheel 13 approaches within about one-half inch of the center of disk 12, roller 44' will be under gap 46 and free to rise up and allow fork 40 to cant, and wheel 13 will be carried by friction with disk 12 around the under half-circle H, Fig. 5ª, to the left side of disk 12 and its motion reversed, roller 44' running down on the beveled end 46' of rib 45 to the under side of said rib.

When the friction-wheel 13 is at the left of the center of disk 12, the force imparted to it by said disk 12 is up and when the wheel approaches the center of the disk it will be carried around the upper half-circle J, Fig. 5ª, to the right side. To make this movement positive and certain, I arrange within the gap 46 an adjustable block 47, projecting from a cam-plate 48, working in a recess in guide-plate 29 and pivoted at 49, its periphery flush with the upper edge of guide-plate 29 and provided with two projections 50 50', which register with a tappet-piece 51 on block 30. When friction-wheel 13 is traversing on either side of the center of disk 12, projections 50 50' are disengaged from tappet-piece 51, leaving cam-plate 48 tilted to one side or the other with that one of the projections 50 50', which is on the side toward block 30, flush with the upper edge of guide-plate 29, and the other projecting above said plate, as shown in Figs. 2 and 5. It is frictionally encumbered to prevent its movement from this position by jarring or other cause. When friction-wheel 13 approaches the center from the right, tappet-piece 51 engages projection 50 and turns cam-plate 48 into the position shown in Fig. 5, block 47 filling gap 46, which prevents roller 44' from entering said gap and holds the friction-wheel 13 on the line of traverse C C, (at N, Fig. 5ᵃ.) If left in this position, friction-wheel 13 continues to turn, but so slowly that the motion imparted to the running-gear is negligible and for short stops where it is desirable to let the motor continue running the movement of the vehicle would be so slight that it would not be a source of inconvenience. A further movement of block 30 to the left turns cam-plate 48, and block 47 raises roller 44, canting fork 40 and lowering friction-wheel 13, moving its point of contact with disk 12 down the broken line N, Fig. 5ᵃ, into the lower half of circle H, Fig. 5ᵃ, from which position it is instantly carried around to the left side of center of disk 12, as hereinbefore explained. In moving from left to right the same operation takes place, except that friction-wheel 13 is carried over on upper half-circle J.

It will be seen from the foregoing that a very slight impulse applied to rod 39 in either direction will cause the friction-wheel 13 to traverse from center to circumference of disk 12, or vice versa, on either side across the dead-center, change the speed, and reverse automatically without releasing its pressure or sliding on the disk, and when it is doing its heaviest work, as well as when running light, always following the movement of block 30, righting up perpendicular and remaining stationary in any position when this impulse is withdrawn.

I preferably connect friction-wheel 13 to the running-gear by an extensible shaft 52, Fig. 3, one portion 53 being tubular and the other, 54, sliding into or "telescoping" with it, said parts being prevented from rotating with respect to each other by means of the inner part 54, having teeth formed entirely around it like "pinion-wire," and the tubular part having a sleeve 53, on the inside of which a corresponding number of teeth are formed to engage with those on part 54. This sleeve is of considerable length, preferably from eight to twelve inches, and part 54 has sixteen teeth, one-eighth inch deep, so there are always in contact from sixteen to twenty-four square inches of wearing-surface. This makes this shaft, as regards rotation, practically a solid shaft and in regard to wear practically indestructible. Another important advantage gained by this construction is that the wearing-surface is perpendicular to the direction of the rotating force, so that there is no cramping or binding, and the parts will slide easily as friction-wheel 13 traverses the face of disk 12 under the greatest strain. A light metal tube 55, attached to a collar 56 on part 54, has a close sliding fit on sleeve 53 and excludes dust. Shaft 52 is connected to axle of friction-wheel 13 by a universal joint 57. This joint can be on the outside, as shown in Fig. 3, or friction-wheel 13 can have a hollow hub, as shown at 58 in Figs. 10 and 11, with its tubular ends journaled in the fork-bearings 41 and the universal joint placed inside with its gyrating point in the rotating plane of friction-wheel 13. In this position the oscillation of wheel 13 would not affect it, and shaft 52 could be made of sufficient stiffness (by giving sleeve 53 greater length) to withstand the effort of turning the driving-wheels and dispense with a universal joint at the driving-axle end of shaft 52.

I preferably set the mechanism at an angle from horizontal to cause traversing line C C prolonged to intersect the axis of driving-axle.

Diagram Figs. 6, 7, and 8 show how my automatically-traversing friction-wheel can be applied to any form of friction transmission by causing the traveling lines at point of contact to vary from tangent or parallel to each other. In Fig. 6 the frictions are two disks, with their revolving planes at a slight angle from each other, with their point of contact at the apex. By raising or lowering the center of one, as at K K, its line of travel at point of contact will vary from tangent to the other, as shown by broken lines K' K', and it will traverse to or from the center of the other. Fig. 7 shows a disk with plane friction, as has been herein described. Fig. 8 shows a cone M with plane friction where varying the lines of travel at point of contact from parallel causes the plane friction to traverse from one end of the cone M to the other.

In Figs. 10 and 11 I show how my automatically-traversing friction-wheel can be used in the form of a "caster-wheel." Block 17, sliding on guide-rods 18, has a stud 59, (its axis being perpendicular to face of disk 12,) on which is pivoted a fork 60, with friction-wheel 13, journaled in the ends of its arms 61, adapting it to oscillate on stud 59 like a pendulum. If block 17 is moved along rods 18 either way, wheel 13 will swing into positions shown by broken lines L L' and traverse to or from center of disk 12, following block 17. When the movement of block 17 ceases, wheel 13 will swing into position shown by full lines and remain so until block 17 is moved again. Wheel 13 can be connected to running-gear by a shaft similar to 52, Fig. 3, or it can have a shaft 62 passing entirely through hub 58 and permanently journaled in brackets 20, as shown. In this case sleeve 53 would be placed inside of hollow hub 58 and be connected to it by universal joint substantially the same as my patent universal joints, No. 317,737, May 12, 1885.

It will be observed that friction-wheel 13 is never disconnected from the motor, and there are no intermediate clutches or disconnecting devices of any sort between propelling-wheels and motors. For this reason no brake is required. The friction-wheel traversing toward center of disk effectually checks and controls the speed of the vehicle. All the functions of regulating the speed, braking, practically stopping, reversing, &c., are performed without coupling or uncoupling any part or disconnecting the motor from the propelling-wheels in any manner and without slipping friction-wheel 13 on face of disk 12.

In going down inclines, checking the speed, &c., the momentum of the vehicle is thrown on the motor, power being transmitted from the running-gear to the motor. The friction of the motor has such a great leverage on this power when transmitted in this direction that it is practically neutralized when friction-wheel 13 is near the center of disk 12; but when it is near the periphery it might increase the speed of the motor beyond a safe limit. To obviate this, I would use an automatic balance-wheel brake, substantially as shown in my application, explosive-engines, Serial No. 118,002.

Preferably I would place supporting-rollers 63, Fig. 4, bearing against the side of disk 12, opposite the traversing-line C' C' on each side of the center near the periphery, of large diameter, with bearings in the motor-frame 23, to counteract the pressure of friction-wheel 13 and relieve the shaft of disk 12 from all strains caused by such pressure.

It will be evident that many changes in the details of construction and arrangement of the apparatus hereinbefore described can be made without departing from the spirit and scope of my invention. Thus, for instance, other means of mounting the friction-wheel so that its plane of movement may be adjusted angularly and the point of contact shifted may be substituted for those shown. Equivalent devices may be substituted for shifting the oscillating pivots from one side to the other, and other forms of support for movement parallel with face of disk and adjusting pressure may be introduced in place of those shown. I intend in the broader claims of this specification to cover all such equivalent devices and in the more specific claims to cover the particular devices illustrated and described and which at the present time seem to be the best embodiment of the invention.

Having thus described my invention, what I claim, and desire to secure by Letters Patent, is—

1. In a variable-speed friction-gearing, the combination of a rotatable disk, a friction-wheel engaging said disk, and means for adjusting said wheel to cause it to automatically traverse said disk on opposite sides of the center thereof.

2. In a variable-speed friction-gearing, the combination of a rotatable disk, a friction-wheel engaging said disk, means for changing the relative positions of said disk and wheel to cause the latter to engage the disk at points on opposite sides of its center, and means for adjusting the wheel angularly to cause it to automatically traverse either section of the disk from the center to the circumference or vice versa.

3. In a variable-speed friction-gearing, the combination of a rotatable disk, a friction-wheel arranged to engage said disk, means for adjusting the wheel across the center of the disk, and means for adjusting the wheel angularly to cause it to automatically traverse the disk on either side of the center thereof.

4. In a variable-speed friction-gearing, the combination of a rotatable disk, a friction-wheel engaging said disk, a shaft connected to said wheel, means for shifting the point of contact of said wheel and disk from one side of the center of said disk to the opposite side of said center to vary the direction of rotation of the shaft, and means for causing the wheel to automatically traverse the disk on either side of its center to vary the speed of the shaft.

5. In a friction-gearing for motor-vehicles, the combination of a rotatable disk, a friction-wheel constantly engaging said disk, means for driving the vehicle permanently connected with said parts, and means for shifting the point of contact between said wheel and disk from one side of the center of said disk to the opposite side of said center and for causing said wheel to automatically traverse said disk, on either side of its center, from the center to the periphery of said disk, whereby the direction of movement of the vehicle can be reversed and the speed of such movement in either direction varied without disconnecting the disk and friction-wheel or disconnecting the means for driving the vehicle from said parts.

6. In a variable-speed friction-gearing for motor-vehicles, the combination of two frictionally-engaged members, means permanently connecting one of said members with a motor, a power-transmitting shaft permanently connected with the other of said members, and means for adjusting the friction member connected with said shaft to cause it to automatically vary its position relative to the other member to change the direction of movement of said shaft or its speed in either direction.

7. In a variable-speed friction-gearing, the combination of a rotatable disk, a wheel frictionally engaging said disk, a support for said wheel mounted to move transversely across the engaged face of the disk and to oscillate about an axis extending at right angles to said disk, whereby the friction-wheel will be adjusted to follow the lateral movement of its support without sliding on the disk, means for moving said support adapted to engage the same at either of two points on opposite sides of the oscillating axis thereof, and means for automatically shifting the connection between said devices and support from one of said points to the other as the friction-wheel passes from one side of the center of the rotatable disk to the other side of said center.

8. In a variable-speed friction-gearing, the combination of a rotatable disk, a friction-wheel engaging said disk and normally extending perpendicular to a radius of the disk passing through the point of contact of the wheel therewith, a support for said wheel permitting oscillation thereof to adjust it into position to automatically traverse the disk, toward or from the center thereof, two studs connected with said support and situated on opposite sides of the axis about which the wheel oscillates, and means adapted to engage said studs and move said support transversely of the rotatable disk, the parts being so arranged that when the said support is moved laterally of the disk the friction-wheel is oscillated and travels freely over the disk and when such movement of its support ceases rocks about the engaged stud as a pivot into its normal position perpendicular to a radius of the disk passing through the point of contact of the wheel and disk, the means for moving said support engaging said studs alternately.

9. In a variable-speed friction-gearing, the combination of a rotatable disk, a friction-wheel engaging said disk, a support for said wheel including two members having parallel faces, and a series of antifriction-balls arranged between said parallel faces, whereby the member connected with the wheel can oscillate slightly relative to the other member of said support, and means for moving said support and wheel transversely of the disk.

10. In a variable-speed friction-gearing, the combination of a rotatable disk, a friction-wheel engaging said disk, a support for said wheel, means for adjusting said wheel relative to the disk to compensate for wear, and means for moving said support and wheel transversely of the disk, without separating the wheel and disk and without sliding the wheel on the disk.

11. In a variable-speed friction-gearing, the combination of a rotatable disk, a friction-wheel engaging said disk, a support for said wheel, guides for said support extending across the face of the disk, said wheel being connected to said support to oscillate about an axis at right angles to the path of movement of the support across the disk, and means for sliding said support on its guides.

12. In a variable-speed friction-gearing, the combination of a rotatable disk, a wheel-support adapted to move transversely of said disk, a friction-wheel mounted on said support, to engage the rotatable disk and adapted to oscillate about an axis extending at right angles to said disk, two studs projecting from the wheel-support and arranged on opposite sides of the axis of oscillation of said wheel, a relatively stationary guide extending across the center of the disk between said studs, a plate mounted to move both longitudinally and transversely of said guide and adapted when moved longitudinally of said guide to engage one of the studs on the wheel-support to oscillate the friction-wheel and adjust it and its support transversely of the rotatable disk, and means for automatically moving said plate transversely of said guide, to release the previously-engaged stud of the wheel-support and engage the other of said studs, as the friction-wheel passes the center of the disk.

13. In a variable-speed friction-gearing, the combination of a rotatable disk, a wheel-support adapted to move transversely of said disk, a friction-wheel mounted on said support to engage the rotatable disk and adapted to oscillate about an axis extending at right angles to said disk, two studs projecting from the wheel-support and arranged on opposite sides of the axis of oscillation of said wheel, a guide extending between said studs and projecting on opposite sides of the center of the rotatable disk, said guide having formed in one face two oppositely-extending, unalined, ways or grooves connected at their inner ends, substantially in line with the center of the rotatable disk, by a shorter, diagonally-extending, groove, a plate mounted to move both longitudinally and transversely of said guide and having a roller adapted to travel in said ways or grooves, the ends of said plate being adapted to engage said studs on the wheel-support and said plate being of such length that it engages said studs alternately as it is moved transversely of its support, and means for moving said plate on said support.

14. In a variable-speed friction-gearing, the combination of a rotatable disk, a friction-wheel engaging said disk, means for adjusting the wheel transversely of the disk, and means for automatically rocking the wheel about an axis parallel to its axis of revolution as it approaches the center of the disk, whereby it will automatically pass said center.

15. In a variable-speed friction-gearing, the combination of a rotatable disk, a wheel-support adapted to move transversely of said disk, a friction-wheel mounted on said support to rock about an axis parallel to its axis of revolution, an arm connected with said wheel, means for moving the wheel-support transversely of the disk, and means for automatically rocking said arm and wheel as the latter approaches the center of the disk.

16. In a variable-speed friction-gearing, the combination of a rotatable disk, a wheel-support adapted to move transversely of said disk, a friction-wheel engaging the disk and connected to said support to rock about an axis parallel to its axis of revolution, a relatively stationary guide extending across the center of the disk, rollers connected with the friction-wheel and contacting with opposite sides of said guide and means for moving the wheel-support transversely of the disk, said guide having a gap or opening formed therein near its middle, whereby the wheel will be caused to automatically rock about the axis of its connection to said support as the rollers connected thereto come into alinement with the gap in said guide.

17. In a variable-speed friction-gearing, the combination of a rotatable disk, a wheel-support adapted to move transversely of said disk, a friction-wheel engaging the disk and connected to said support to rock about an axis parallel to its axis of revolution, a relatively stationary guide extending across the center of the disk and having a gap or opening in alinement with said disk-center, rollers connected with the friction-wheel and contacting with opposite sides of said guide, means for moving the wheel-support transversely of the disk, a pivoted stop for closing the gap in said guide, and means connected with said stop and extending into the path of movement of the wheel-support, whereby said stop may be automatically adjusted to permit the wheel to rock about an axis parallel to its axis of revolution as it approaches the center of the disk.

18. In a variable-speed friction-gearing, the combination of a rotatable disk, a friction-wheel engaging said disk, means for adjusting said wheel to cause it to automatically traverse said disk toward or from the center thereof, and means for causing said wheel to automatically pass the center of the disk.

19. In a variable-speed friction-gearing, the combination of a rotatable disk, a friction-wheel engaging said disk, means for causing said wheel to traverse the disk, and means for shifting the point of contact of the wheel and disk, as the wheel approaches the center of the disk, from the plane including the axis of the disk and the points at which the wheel contacts with the disk in traversing the latter, whereby the wheel will be automatically carried around the center of the disk.

20. In a variable-speed friction-gearing, the combination of two rotatable, frictionally-engaged, elements, means for adjusting one of said elements transversely of the other while engaged therewith, the point of contact between said elements following, during such traversing, a straight line extending through the center of the relatively stationary element, and means for moving the point of contact between said elements from said line as it approaches the center of the relatively stationary element, to cause such traversing element to automatically pass said center.

21. In a variable-speed friction-gearing, the combination of two rotatable, frictionally-engaged, elements, means for adjusting one of said elements transversely of the other while engaged therewith, the point of contact between said elements following, during such traversing, a horizontal line extending through the center of the relatively stationary element, and means for shifting the said point of contact vertically relative to said line, as the traversing element approaches the center of the other element whereby the traversing element will automatically pass said center.

22. In a variable-speed friction-gearing, the combination of two rotatable, frictionally-engaged, elements, means for causing one of said elements to move transversely of the other while engaged therewith, the point of contact between said elements following, during such traversing, a straight line that extends through the center of the relatively stationary element, and means for bodily moving the traversing element as it approaches the center of the relatively stationary element to shift the point of contact between the elements from said straight line, for the purpose specified.

23. In a variable-speed friction-gearing, the combination of two frictionally-engaged members, means for driving one of said members, means for adjusting the other friction member to cause it to automatically traverse the driven member to vary its speed, and an extensible power-transmitting shaft connected to the adjustable friction member.

24. In a variable-speed friction-gearing, the combination of two frictionally-engaged members, means for driving one of said members, a longitudinally-extensible power-transmitting shaft connected to the other friction member by a universal joint, and means for adjusting the last said member to cause it to automatically traverse the driven member and vary the speed of the transmitting-shaft.

25. In a variable-speed friction-gearing, the combination of two frictionally-engaged members, means for driving one of said members, a power-transmitting shaft, consisting of two freely-telescoping sections, connected to the other friction member, and means for adjusting the last said member to cause it to automatically traverse the driven friction member to vary the speed of the transmitting-shaft.

26. In a variable-speed friction-gearing, the combination of two frictionally-engaged members, means for driving one of said members, a power-transmitting shaft connected to the other friction member and consisting of two freely-telescoping sections, one having a series of longitudinally-extending peripheral ribs and the other having a corresponding series of longitudinally-extending grooves into which the ribs on the other section extend, and means for adjusting the friction member connected to said shaft transversely of the other friction member to vary the speed of the transmitting-shaft.

In testimony whereof I affix my signature in presence of two witnesses.

EDWARD P. COWLES.

Witnesses:
JOHN M. STULL,
A. S. PHELPS.